Oct. 26, 1948.   A. A. KOLLMAN   2,452,245
HOSE CLAMP
Filed April 27, 1944
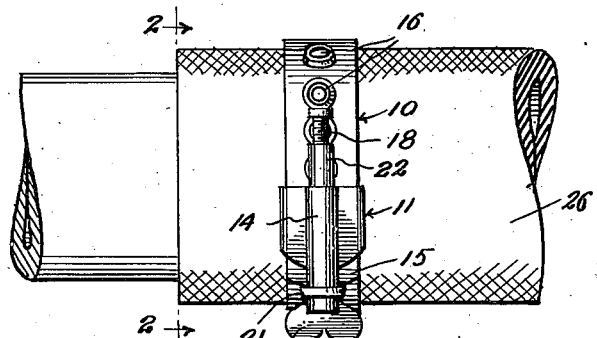
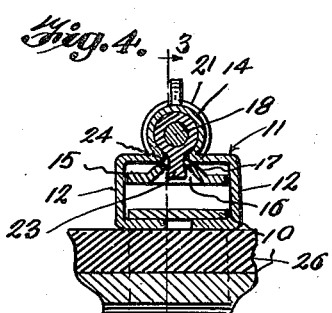
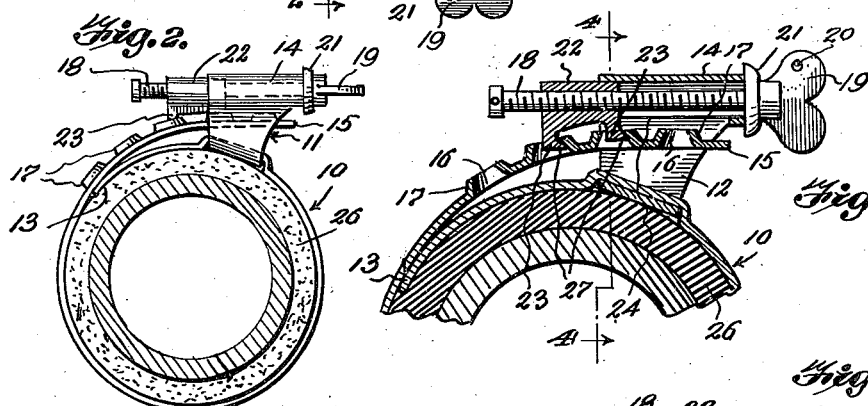
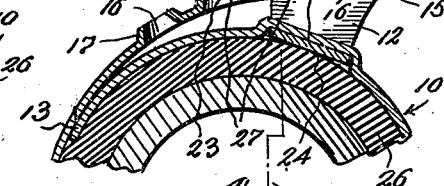
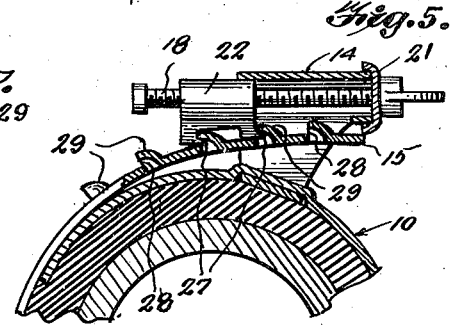
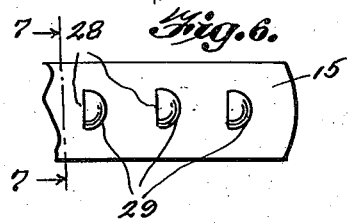
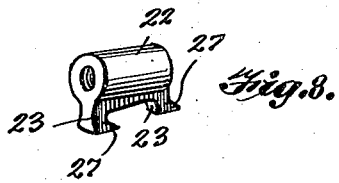
Inventor
ALEXANDER A. KOLLMAN
By Wilfred E. Lawson
Attorney Patented Oct. 26, 1948

2,452,245

UNITED STATES PATENT OFFICE 2,452,245

HOSE CLAMP

Alexander A. Kollman, Los Angeles, Calif.

Application April 27, 1944, Serial No. 533,008

1 Claim. (Cl. 24—19)

This invention relates generally to the class of clamps and pertains particularly to improvements in hose clamps.

A principal object of the present invention is to provide a hose clamp, employing a band member, in which a novel means is provided for drawing the ends of the band tightly together and in overlapping relation so that there will be obtained a complete annular compression band around the hose without pinching the hose and without leaving any portion where clamping pressure is not applied.

Another object of the invention is to provide an improved hose clamp having a novel screw actuated shiftable element which is attached to one end of the band and is drawn up upon a screw, carried by the other end of the band, so as to bring about the desired construction of the band around the hose.

Another object of the invention is to provide a hose clamp having a band carrying a guide member, in which is loosely or swivelly mounted a screw, with a dogging sleeve mounted upon the screw and adapted for connection in a novel manner with the free end of the band to draw such free end tightly into overlapping relation with the underlying adjacent end of the band.

The invention will be best understood from a consideration of the following detailed description taken with the accompanying drawing forming a part of the specification, with the understanding, however, that the invention is not confined to a strict conformity with the showing of the drawing but may be changed or modified so long as such changes or modifications do not depart materially from the salient features of the invention as expressed in the appended claim.

In the drawing:

Figure 1 is a view in plan showing one embodiment of the invention applied to a hose.

Figure 2 is a section on line 2—2 of Figure 1.

Figure 3 is a section at the connected ends of the band taken substantially on the line 3—3 of Figure 4, showing the action of the dogging sleeve.

Figure 4 is a section on the line 4—4 of Figure 3.

Figure 5 is a view partly in section and partly in elevation of a portion of a modified embodiment of the invention.

Figure 6 is a plan view of the slotted end of the band shown in Figure 5.

Figure 7 is a section on the line 7—7 of Figure 6.

Figure 8 is a view in perspective of the dogging sleeve.

Referring now more particularly to the drawing, numeral 10 generally designates the hose encircling clamping band to which is attached inwardly of one end, the outstanding guide which is generally designated 11. This guide has the spaced side portions 12 which are permanently joined each to a side edge of the band 10 inwardly of the end 13 which may be referred to as the fixed end. These side portions 12 of the guide are formed from a single piece of metal of suitable weight and such piece of metal is shaped to provide a guide sleeve 14 which is maintained spaced from the band and longitudinally thereof.

The band at its opposite or free end 15 is provided with a series of apertures 16 which are arranged lengthwise of the band as shown and the metal of the band around each of the apertures is raised or pressed outwardly, forming a collar 17.

Extending through the guide sleeve 14 is a screw 18 which carries a flat head 19 at one end, through which is formed an aperture 20 to receive a locking wire, not shown.

The head 19 is formed with a cupped shoulder 21 which receives and bears against the end of the guide sleeve 14 as shown in Figure 5. As is also shown in this figure the screw 18 is extended through the guide sleeve from the end thereof remote from the fixed end 13 of the band. This shoulder holds the screw against side motion with respect to the adjacent end of the sleeve.

Adapted to slide into the guide sleeve 14 in surrounding relation with the screw 18 is the tubular dogging sleeve 22 which is interiorly threaded for engagement with the screw 18. This dogging sleeve carries the two prongs or dogs 23 which project from the guide sleeve 14 through the slot 24 in the under side thereof, towards the band.

The dogs 23 are designed for engagement in the apertures 16, the raised collars 17 providing clearance for the dogs so that they will not press against the top of the fixed end portion 13 of the band.

In the use of the hose clamp, the band is placed around the hose which is here designated 26, and the free end 15 is run through the guide between the band end 13 and the guide sleeve 14.

The dogging sleeve is initially located adjacent the end of the screw 18 remote from the head 19 and after the free end of the band has been inserted in the guide the dogs 23 are engaged in the nearest pair of apertures 16 whereupon the screw is turned to thread the dogging sleeve back into the guide sleeve 14. This will impose a pull upon the free end of the band and an opposite pull upon the fixed end thereof, causing the two ends to be drawn tightly into overlapping relation. Since the guide 11 is set inwardly from the said fixed end of the band it will be seen that the free end of the band will be drawn tightly across the fixed end of the band so that pressure will be applied to the hose where the band ends overlap as well as throughout the remaining portion of the band where it contacts the body of the hose.

In order that a more positive engagement may be obtained between the dogs 23 and the edges of the collars in which they are engaged, the advancing edges of the dogs may be formed to provide lips 27 which will slip under the collars and thus prevent the dogs from escaping from the apertures or collars after a slight pulling action upon the free end of the band has been established.

While there has been described and shown circular apertures 16 having a portion of the metal of the band raised around them in the form of collars 17 the means for establishing a coupling between the dogs and the band may be in the form of slits transversely of the longitudinal center of the band, at one side of which the metal of the band is pressed up as indicated at 29. This provides a raised portion of the metal under which the flange 27 of the dog engages when it is inserted through the slit 28. Since the raised part of the metal is upon the side of the slit nearest the free end of the band it will be readily seen that when the dog is shifted toward such free end after being engaged in the slit, the desired tightening action of the band around the hose will be obtained.

From the foregoing it will be readily apparent that there is provided by the present invention an improved hose clamp which can be easily and quickly applied to a hose without the necessity of removing the hose from a pipe or other fixture to which it may be attached, and in which the connection between the dogging sleeve and the free end of the band is such that failure of the securing means is unlikely because of the double engagement of the dogs in the band apertures. It will also be readily apparent as the band is tightened the locking action between the band and the dogs becomes more positive so that danger of accidental disconnection is avoided.

By providing the aperture 20 in the head of the screw the clamp can be secured by threading a wire through such aperture and attaching it to the guide whereby the turning of the screw under the effects of vibration, with the subsequent loosening of the clamp, will be avoided.

It will also be apparent that by mounting the dog moving screw in spaced relation with the top of the band and tangential thereto, the free end of the band can be pulled straight across the fixed end of the band without materially bending such free end thereby causing the two ends or the contacting portions of the band to lie firmly one upon the other and to complete the tightening or constricting circle around the hose.

I claim:

A device of the character described for engaging and drawing to a desired position an apertured end of a band-like element, comprising a relatively long cylindrical guide sleeve open at each end, the guide sleeve having a side opening from one end through a major portion of its length to form a narrow guide slot, the material of the guide sleeve at each side of said slot being extended outwardly, then extended at right angles to the first line of extension away from the sleeve and finally extended inwardly in substantially parallel relation with the first extension to form a guide through which the apertured end of the band may extend, the said guide being adapted to be secured in a fixed position, a screw extending axially through the sleeve and having a head upon one end, a bearing member carried by the screw adjacent to the head and having a depressed face engaging over and bearing against the other end of the sleeve, a dogging sleeve of substantially cylindrical form mounted within the guide sleeve for sliding movement therein, said screw being threaded through said dogging sleeve, and a dogging prong integral with the dogging sleeve and extending through and snugly engaging in said guide slot and adapted for engagement in an aperture in the band-like element, the dogging prong having sliding engagement in the guide slot.

ALEXANDER A. KOLLMAN.

REFERENCES CITED

The following references are of record in the file of this patent:

UNITED STATES PATENTS

| Number | Name | Date |
|---|---|---|
| 1,965,207 | Walker | July 3, 1934 |
| 1,986,748 | Pritchard | Jan. 1, 1935 |
| 2,109,500 | McAneny | Mar. 1, 1936 |

FOREIGN PATENTS

| Number | Country | Date |
|---|---|---|
| 447,963 | Great Britain | May 28, 1936 |